United States Patent
Shiraoya et al.

(10) Patent No.: US 9,587,719 B2
(45) Date of Patent: Mar. 7, 2017

(54) INTERNAL COMBUSTION ENGINE AND MOTORCYCLE EQUIPPED WITH THE ENGINE

(71) Applicant: YAMAHA HATSUDOKI KABUSHIKI KAISHA, Iwata-shi, Shizuoka (JP)

(72) Inventors: Takehiko Shiraoya, Shizuoka (JP); Kyohei Fujikura, Shizuoka (JP); Tadakatsu Hosokawa, Shizuoka (JP); Nobuyuki Miyoshi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 282 days.

(21) Appl. No.: 14/281,962

(22) Filed: May 20, 2014

(65) Prior Publication Data
US 2014/0349795 A1    Nov. 27, 2014

(30) Foreign Application Priority Data
May 23, 2013   (JP) .................................. 2013-108646

(51) Int. Cl.
*F16H 7/08* (2006.01)
*F01L 1/02* (2006.01)
(Continued)

(52) U.S. Cl.
CPC ................ *F16H 7/08* (2013.01); *F01L 1/022* (2013.01); *F01L 1/46* (2013.01); *F01M 9/10* (2013.01);
(Continued)

(58) Field of Classification Search
CPC ............... F16H 7/08; F16H 2007/0806; F16H 2007/0812; F16H 2007/0859; F01M 11/02; F01M 9/10
(Continued)

(56) References Cited

U.S. PATENT DOCUMENTS 5,352,159 A * 10/1994 Suzuki ...................... F16H 7/08
                                                                 474/110
5,366,418 A    11/1994 Fukushima et al.
(Continued)

FOREIGN PATENT DOCUMENTS

| GB | 2 272 958 A | 6/1994 |
|----|-------------|--------|
| JP | 2010-151163 A | 7/2010 |
| JP | 2012-077655 A | 4/2012 |

OTHER PUBLICATIONS

Official Communication issued in corresponding European Patent Application No. 14165521.7 mailed on Jun. 24, 2014.

*Primary Examiner* — William E Dondero
*Assistant Examiner* — Robert T Reese
(74) *Attorney, Agent, or Firm* — Keating and Bennett, LLP (57) ABSTRACT

An internal combustion engine includes a cam chain chamber accommodating a cam chain and a chain guide guiding the cam chain. The engine also includes a chain tensioner including a case main body, a plunger sliding in the case main body, a coil spring biasing the chain guide against the cam chain via the plunger, interlocking teeth located on a surface of the plunger, and an engaging portion engaged with the interlocking teeth and configured to inhibit the plunger from moving in a direction away from the chain guide. The engine also includes oil supply passages in an inner wall of the cylinder head and an inner wall of the cylinder body and configured to supply oil to the chain tensioner.

8 Claims, 8 Drawing Sheets

(51) Int. Cl.
*F01L 1/46* (2006.01)
*F01M 9/10* (2006.01)
*F01M 11/02* (2006.01)

(52) U.S. Cl.
CPC ........... *F01M 9/106* (2013.01); *F16H 7/0848* (2013.01); *F01M 11/02* (2013.01); *F16H 2007/0806* (2013.01); *F16H 2007/0812* (2013.01); *F16H 2007/0857* (2013.01); *F16H 2007/0859* (2013.01); *F16H 2007/0893* (2013.01)

(58) Field of Classification Search
USPC .......................................................... 474/110
See application file for complete search history.

(56) References Cited

U.S. PATENT DOCUMENTS

| | | | |
|---|---|---|---|
| 5,913,742 A | 6/1999 | Nakamura et al. | |
| 7,699,730 B2 | 4/2010 | Emizu et al. | |
| 2004/0266573 A1* | 12/2004 | Yoshida | C22C 21/02 474/110 |
| 2012/0225743 A1* | 9/2012 | Ishii | F16H 7/0848 474/110 |

* cited by examiner

INTERNAL COMBUSTION ENGINE AND MOTORCYCLE EQUIPPED WITH THE ENGINE

BACKGROUND OF THE INVENTION

1. Field of the Invention

The present invention relates to an internal combustion engine and a motorcycle equipped with the internal combustion engine.

2. Description of the Related Art

Conventionally, in an internal combustion engine for motorcycles or the like, the cylinder head is provided with intake valves and exhaust valves for opening/closing a combustion chamber as well as a camshaft for driving these valves. The camshaft is linked to a crankshaft via a cam chain and is rotated as the crankshaft rotates. The cam chain is accommodated in a cam chain chamber, which is formed in the cylinder head and a cylinder body positioned below the cylinder head.

The tension on the cam chain changes depending on the rotational speed of the crankshaft. A structure for maintaining the tension on the cam chain at an appropriate level is known. In the known structure, a chain guide for guiding the cam chain and a chain tensioner for applying a force to the cam chain via the chain guide are disposed in the cam chain chamber. Oil is circulated in the cam chain chamber, and the oil scattered from the rotating cam chain is supplied to the chain tensioner. JP 2012-077655 A discloses a technique of supplying oil to a chain tensioner device by causing the oil spattered from a cam chain to collide against a wall provided in the cylinder head.

The chain tensioner may have a cylindrical case, a plunger sliding in the case, a spring for biasing a chain guide against a cam chain, and a ratchet that comes into contact with the plunger and inhibits the plunger from moving in a direction away from the chain guide. A problem with such a chain tensioner is that, when a sufficient amount of oil is not supplied to the chain tensioner, the chain tensioner does not work appropriately, and moreover, strange noise occurs at the contact surface between the ratchet and the plunger when in operation. In view of the problem, it is necessary to supply oil to the chain tensioner actively to smoothly operate the chain tensioner. However, if a passage for supplying oil directly to the chain tensioner is formed as a separate part from the cylinder head and the cylinder body, a complex structure and a higher cost result.

SUMMARY OF THE INVENTION

In view of the foregoing and other problems, preferred embodiments of the present invention provide an internal combustion engine that makes it possible to supply a sufficient amount of oil to the chain tensioner with a simple structure.

According to a preferred embodiment of the present invention, an internal combustion engine includes a cylinder body including a cylinder therein; a cylinder head joined to the cylinder body; a cam chain chamber provided in the cylinder body and the cylinder head, and configured to accommodate a cam chain and a chain guide configured to guide the cam chain; a chain tensioner provided in the cam chain chamber, and including a cylindrical or substantially cylindrical case main body, a plunger sliding in the case main body, a spring biasing the chain guide against the cam chain via the plunger, interlocking teeth located on a surface of the plunger, and an engaging portion engaged with the interlocking teeth and configured to inhibit the plunger from moving in a direction away from the chain guide; and an oil supply passage provided in an inner wall of at least one of the cylinder head and the cylinder body, and configured to supply oil to the chain tensioner.

In the internal combustion engine according to a preferred embodiment of the present invention, the chain tensioner, which is preferably provided in the cam chain chamber, includes the plunger configured to slide in the case main body, the spring biasing the chain guide against the cam chain via the plunger, and the engaging portion engaged with the interlocking teeth located on a surface of the plunger and configured to inhibit the plunger from moving in a direction away from the chain guide. The oil supply passage configured to supply oil to the chain tensioner is provided in an inner wall of at least one of the cylinder head and the cylinder body. Since the oil supply passage is preferably located in an inner wall of at least one of the cylinder head and the cylinder body, the structure of the internal combustion engine does not become complicated. Moreover, because the oil supply passage does not need to be formed or provided in an independent member, the number of parts of the internal combustion engine decreases. Accordingly, a cost reduction and a weight reduction of the internal combustion engine are achieved. Furthermore, the oil is directly supplied to the chain tensioner by causing the oil scattered from the cam chain and the oil circulating in the internal combustion engine to flow into the oil supply passage. As a result, the chain tensioner is operated smoothly, and the strange noise occurring at the contact surface between the engaging portion and the interlocking teeth of the plunger is prevented.

In another preferred embodiment of the present invention, the oil supply passage is in communication with the cam chain chamber at a location above the chain tensioner, so as to supply oil from the cam chain chamber to the chain tensioner.

This allows a portion of the oil scattered from the cam chain within a region above the chain tensioner to flow into the oil supply passage, making it possible to directly supply the oil to the chain tensioner.

In another preferred embodiment of the present invention, the internal combustion engine includes a counter bored portion located above the oil supply passage and extending radially outward of the oil supply passage, and the cam chain chamber and the oil supply passage are in communication with each other via the counter bored portion.

As a result, a portion of the oil scattered from the cam chain within a region above the chain tensioner is collected in the counter bored portion and allowed to flow into the oil supply passage. Therefore, a larger amount of oil is supplied directly to the chain tensioner.

In another preferred embodiment of the present invention, at least a portion of the oil supply passage is positioned closer to the cylinder than is the cam chain.

This allows the oil scattered from the cam chain in a region above the chain tensioner to flow into the oil supply passage more easily.

In another preferred embodiment of the present invention, an upper end of the oil supply passage is positioned lower than an upper end of the chain guide.

This allows the oil scattered from the cam chain in a region above the chain tensioner to flow into the oil supply passage more easily.

In another preferred embodiment of the present invention, the cylinder body includes a first oil passage configured to circulate oil supplied to the cylinder head, the cylinder head includes a second oil passage being in communication with the first oil passage, and the oil supply passage is in communication with the first oil passage or the second oil passage.

This allows a portion of the oil forcibly supplied to the cylinder head to flow into the oil supply passage, making it possible to directly supply the oil to the chain tensioner.

In another preferred embodiment of the present invention, the chain tensioner includes an introduction port provided in the case main body and configured to introduce oil external to the case main body into the case main body, and the oil supply passage is in communication with the introduction port.

This makes it possible to supply oil directly into the case main body and to supply a larger amount of oil to the contact surfaces between the engaging portion of the case main body and the interlocking teeth of the plunger. Therefore, the chain tensioner is operated smoothly.

In another preferred embodiment of the present invention, the oil supply passage has an inner diameter greater than that of the introduction port.

This makes it possible to supply a larger amount of oil directly to a specific portion of the interior of the case main body.

A motorcycle according to yet another preferred embodiment of the present invention includes an internal combustion engine according to one of the preferred embodiments of the present invention described above.

Various preferred embodiments of the present invention make it possible to obtain a motorcycle that exhibits the above-described advantageous effects.

Thus, various preferred embodiments of the present invention make it possible to provide an internal combustion engine that supplies a sufficient amount of oil to the chain tensioner with a simple structure.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
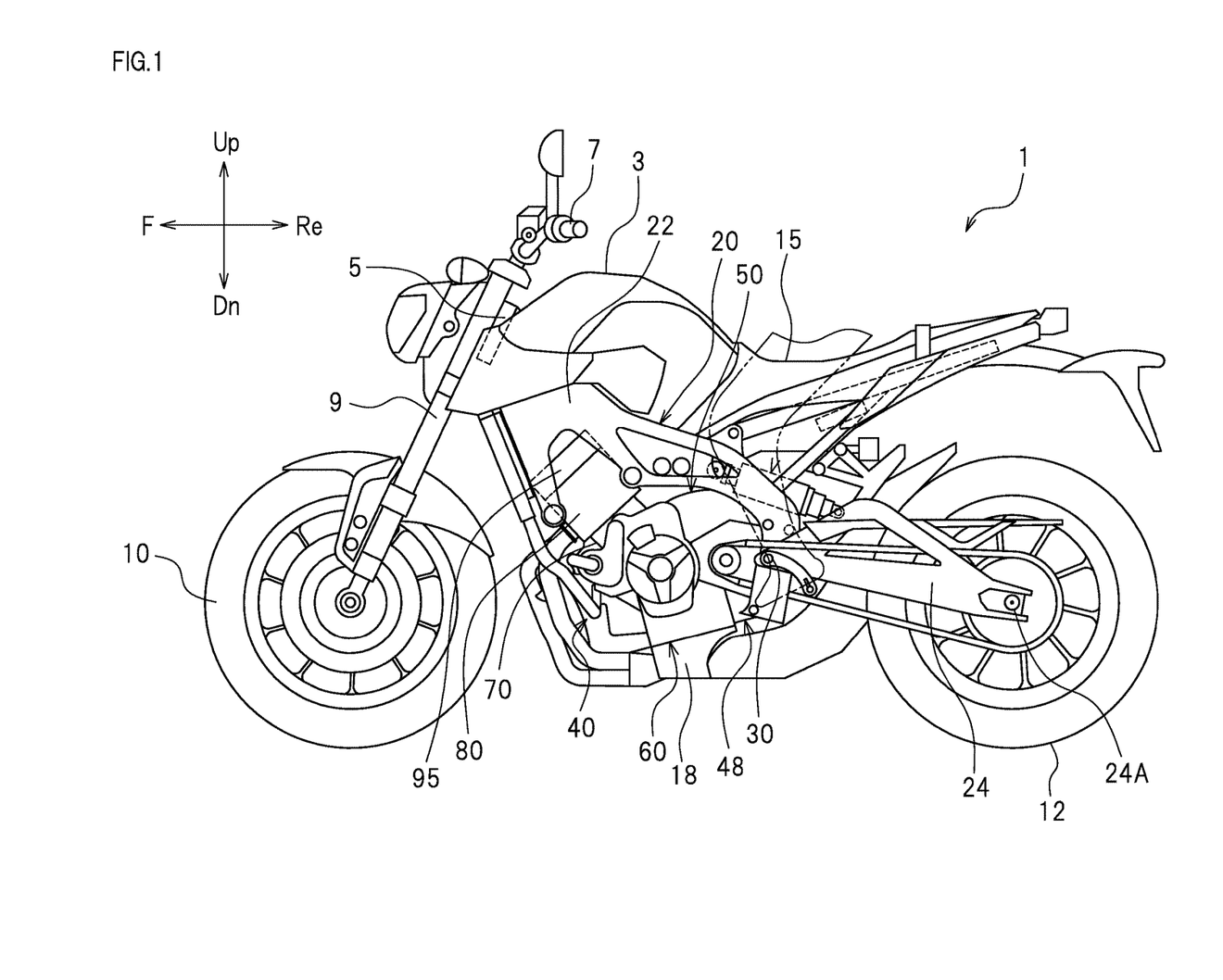
FIG. 1 is a left side view illustrating a motorcycle according to a preferred embodiment of the present invention.

Preferred embodiments of the present invention will be described below with reference to the drawings. As illustrated in FIG. 1, a motorcycle 1 according to a present preferred embodiment preferably is an on-road type motorcycle 1. It should be noted, however, that the motorcycle according to preferred embodiments of the present invention is not limited to the on-road type motorcycle 1. The motorcycle according to preferred embodiments of the present invention may be any other type of motorcycle, such as a moped type motorcycle, an off-road type motorcycle, or a scooter type motorcycle.

In the following description, the terms "front," "rear," "left," "right," "up," and "down" respectively refer to front, rear, left, right, up, and down as defined based on the perspective of the rider seated on the seat 15 of the motorcycle 1, unless specifically indicated otherwise. The terms "above/up" and "below/down" respectively mean the relative vertical positions above/up and below/down as used when the motorcycle 1 is stationary on a horizontal plane. Reference characters F, Re, L, R, Up, and Dn in the drawings indicate front, rear, left, right, up, and down, respectively.

As illustrated in FIG. 1, the motorcycle 1 includes a head pipe 5 and a body frame 20 secured to the head pipe 5. A steering shaft (not shown) is supported on the head pipe 5, and a handlebar 7 is provided on an upper portion of the steering shaft. A front fork 9 is provided on a lower portion of the steering shaft. A front wheel 10 is supported rotatably at the lower end of the front fork 9. A fuel tank 3 is disposed behind the head pipe 5, and a seat 15 is disposed at the rear of the fuel tank 3. The fuel tank 3 and the seat 15 are supported by the body frame 20.

The body frame 20 includes a left main frame 22 extending rearward and obliquely downward from the head pipe 5, and a right main frame (not shown) extending rearward and obliquely downward from the head pipe 5 and being positioned to the right of the left main frame 22. The body frame 20 includes a left rear arm 24 and a right rear arm (not shown). The left rear arm 24 is disposed behind the left main frame 22 and is coupled to the left main frame 22 via a pivot shaft 30. The right rear arm is disposed behind the right main frame and is coupled to the right main frame via the pivot shaft 30. A rear wheel 12 is rotatably supported at a rear end portion 24A of the left rear arm 24 and a rear end portion of the right rear arm.

The motorcycle 1 includes an internal combustion engine 40. The internal combustion engine 40 is disposed under the left main frame 22 and the right main frame. The internal combustion engine 40 is supported non-swingably by the left main frame 22 and the right main frame.

Figure 2:
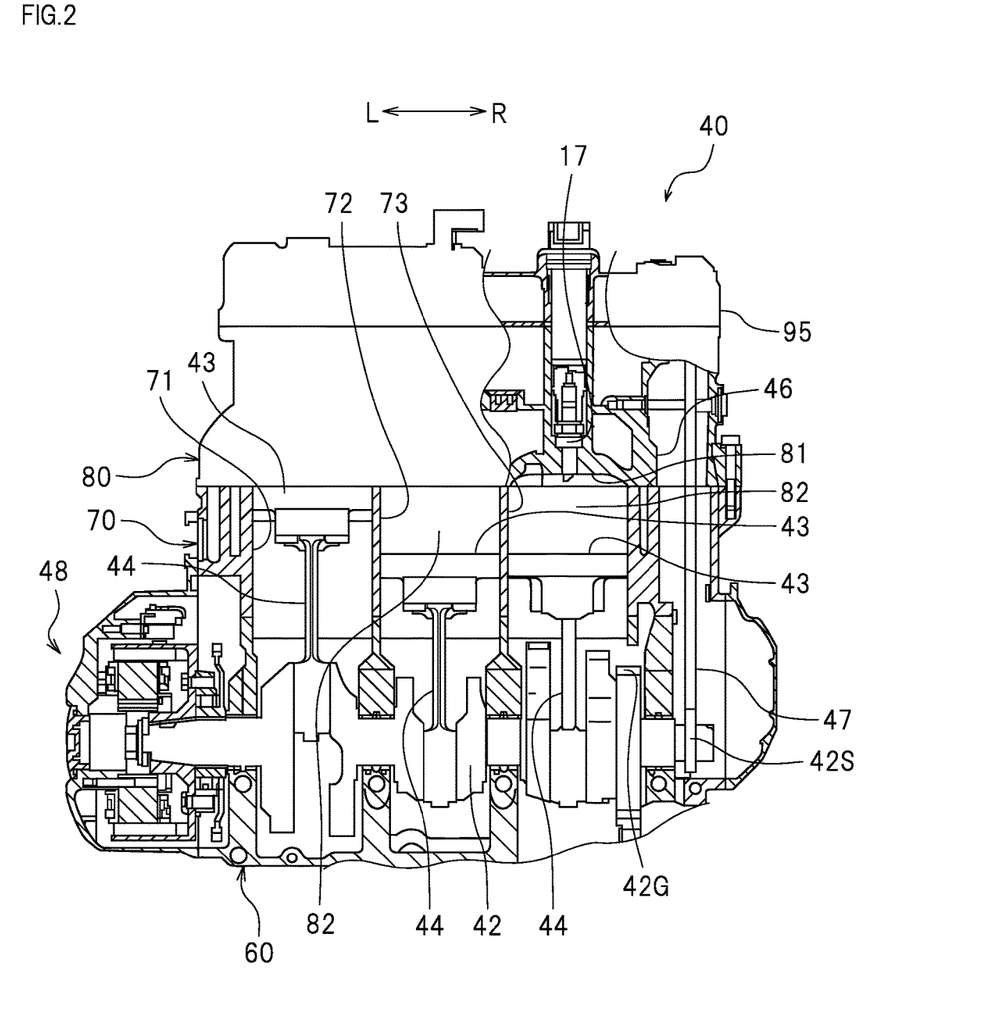
FIG. 2 is a cross-sectional view illustrating a portion of the internal combustion engine according to a preferred embodiment of the present invention.

As illustrated in FIG. 2, the internal combustion engine 40 preferably is a multi-cylinder engine. The engine 40 includes a crankshaft 42 extending in a transverse direction and a crankcase 48 accommodating the crankshaft 42. The crankcase 48 includes the upper crankcase 50 (see FIG. 1) and the lower crankcase 60. The upper crankcase 50 is disposed above the crankshaft 42. The lower crankcase 60 is disposed below the crankshaft 42, and is joined to the upper crankcase 50. An oil pan 18 (see FIG. 1) configured to recover the oil having been circulated through the inside of the internal combustion engine 40 is disposed below the lower crankcase 60. The lower crankcase 60 and the oil pan 18 are joined to each other. As illustrated in FIG. 2, the crankshaft 42 extends in a transverse direction (in a vehicle width direction). A sprocket 42S is provided at the right end portion of the crankshaft 42. A crank gear 42G is fixed to a portion of the crankshaft 42 that is more leftward than the sprocket 42S.

As illustrated in FIG. 1, the internal combustion engine 40 includes a cylinder body 70, a cylinder head 80, and a cylinder head cover 95. The cylinder body 70 extends frontward and obliquely upward from the upper crankcase 50. The cylinder head 80 is disposed above the cylinder body 70 and joined to the cylinder body 70. The cylinder head cover 95 is disposed above the cylinder head 80 and joined to an end portion of the cylinder head 80. In the present preferred embodiment, the cylinder body 70 and the upper crankcase 50 preferably are integrally formed with each other so as to be defined by a single monolithic member. However, the cylinder body 70 and the upper crankcase 50 may be formed of separate members, for example. It is possible that a gasket may be disposed between the cylinder head 80 and the cylinder body 70.

As illustrated in FIG. 2, a first cylinder 71, a second cylinder 72, and a third cylinder 73 are provided inside the cylinder body 70. The internal combustion engine 40 preferably is a three-cylinder engine, for example. The first cylinder 71, the second cylinder 72, and the third cylinder 73 are disposed from left to right in that order. The first cylinder 71, the second cylinder 72, and the third cylinder 73 accommodate pistons 43. Each of the pistons 43 is connected to the crankshaft 42 via a connecting rod 44. The internal combustion engine 40 of the present preferred embodiment preferably is a three-cylinder engine including three cylinders 71 to 73. However, the internal combustion engine 40 may be a single-cylinder engine including one cylinder, or may be a multi-cylinder engine that includes two cylinders, or four or more cylinders, for example. It is preferable that the internal combustion engine 40 be a multi-cylinder engine including three or more cylinders, for example.

The internal combustion engine 40 preferably includes three combustion chambers 82 that are lined up in a vehicle width direction. The combustion chamber 82 includes a top surface of the piston 43, the inner circumferential wall of each of the cylinders 71 to 73, and a recessed portion 81 located in the cylinder head 80. The combustion chamber 82 is provided with an ignition device 17 configured to ignite the fuel in the combustion chambers 82.

Figure 4:
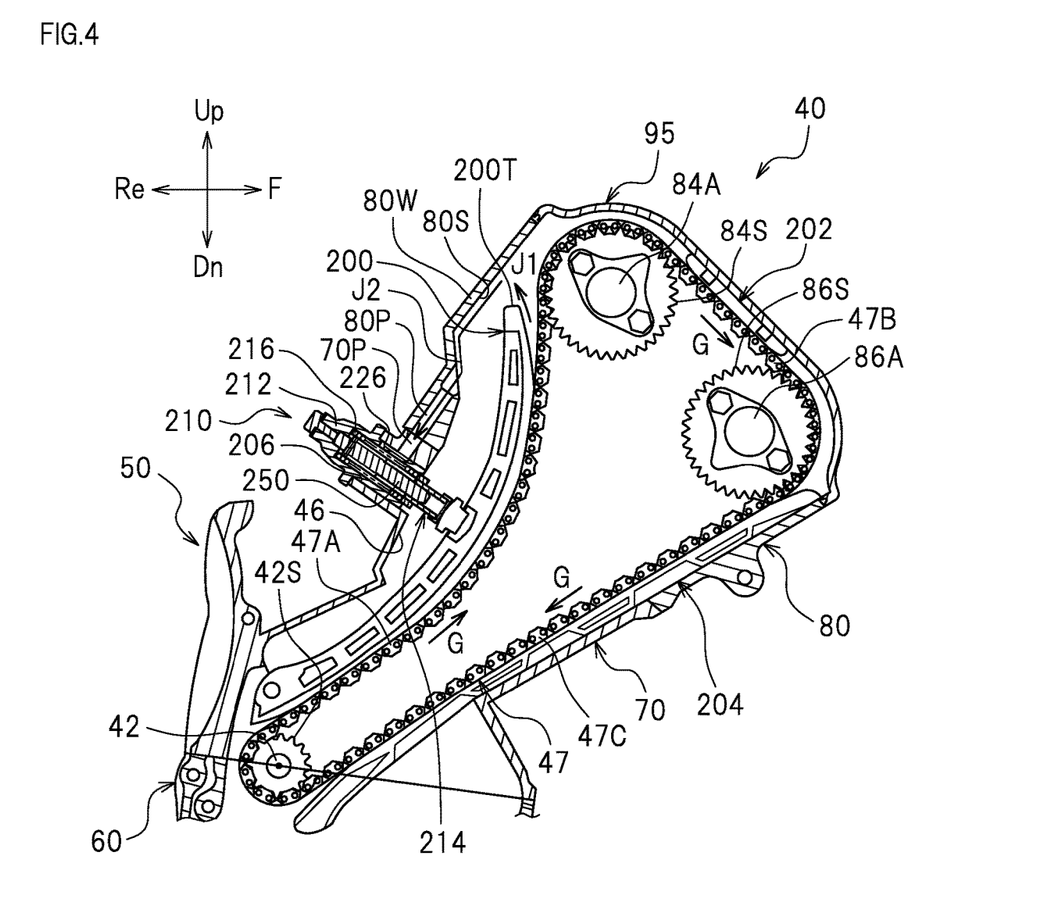
FIG. 4 is a right side view illustrating a cam chain chamber of the internal combustion engine according to a preferred embodiment of the present invention.

As illustrated in FIG. 4, the internal combustion engine 40 includes the cam chain chamber 46 configured to accommodate the cam chain 47. The cam chain chamber 46 of the present preferred embodiment extends over the entirety of the cylinder head cover 95, the cylinder head 80, the cylinder body 70, the upper crankcase 50, and the lower crankcase 60. As illustrated in FIG. 2, the cam chain chamber 46 is disposed to the right of the third cylinder 73, which is the rightmost one of the first cylinder 71, the second cylinder 72, and the third cylinder 73.

Figure 3:
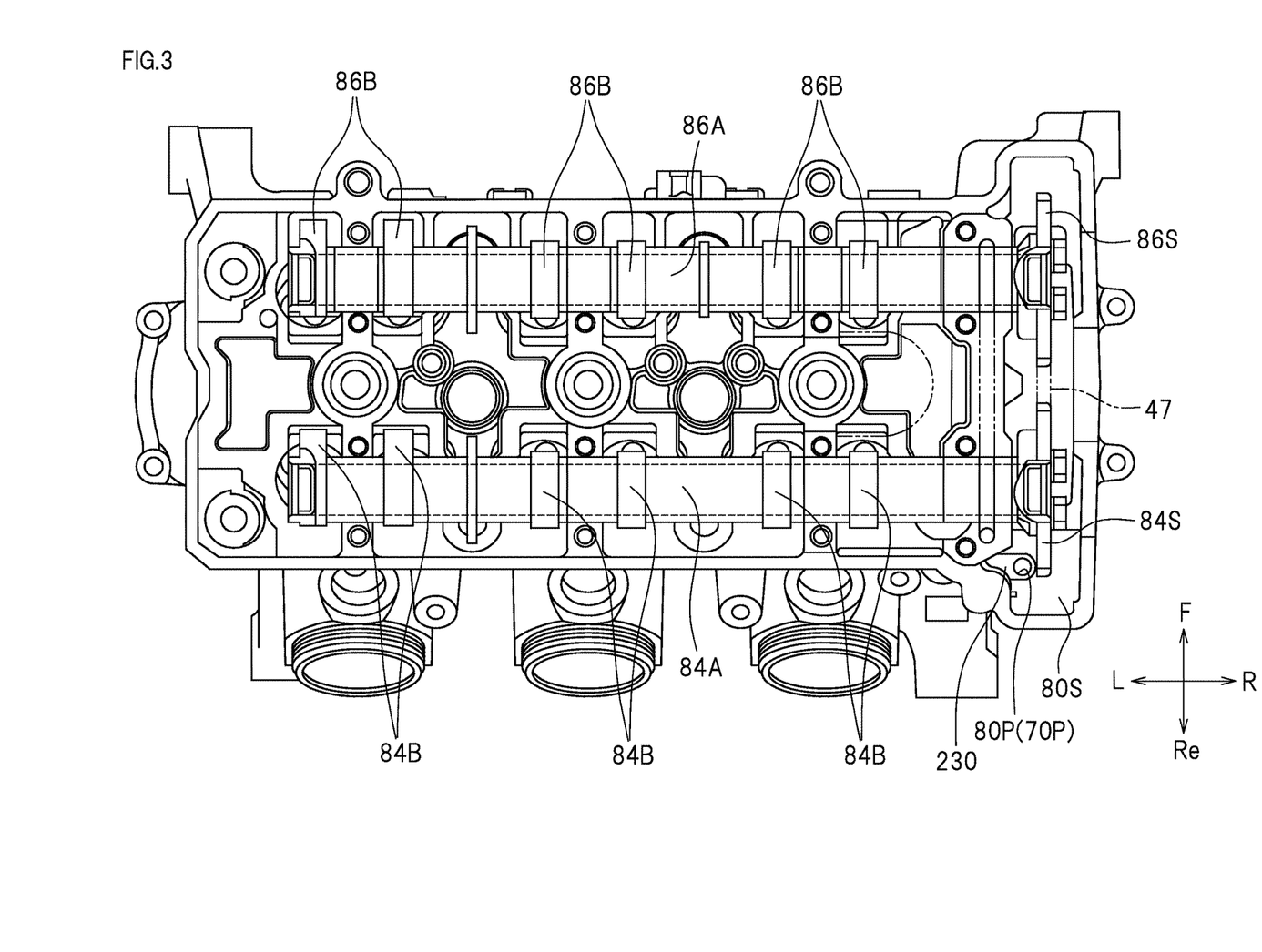
FIG. 3 is a plan view of a cylinder head according to a preferred embodiment of the present invention.

As illustrated in FIG. 4, an intake camshaft 84A and an exhaust camshaft 86A extending in a transverse direction are disposed between the cylinder head 80 and the cylinder head cover 95. As illustrated in FIG. 3, the intake camshaft 84A is provided with an intake cam 84B configured to operate an intake valve, which is not shown. The exhaust camshaft 86A is provided with an exhaust cam 86B configured to operate an exhaust valve, which is not shown. A cam chain sprocket 84S is fitted to the right end portion of the intake camshaft 84A. A cam chain sprocket 86S is fitted to the right end portion of the exhaust camshaft 86A. As illustrated in FIG. 4, the cam chain 47 is looped over the cam chain sprockets 84S and 86S and the sprocket 42S. The cam chain 47 interlocks with the crankshaft 42.

Figure 6:
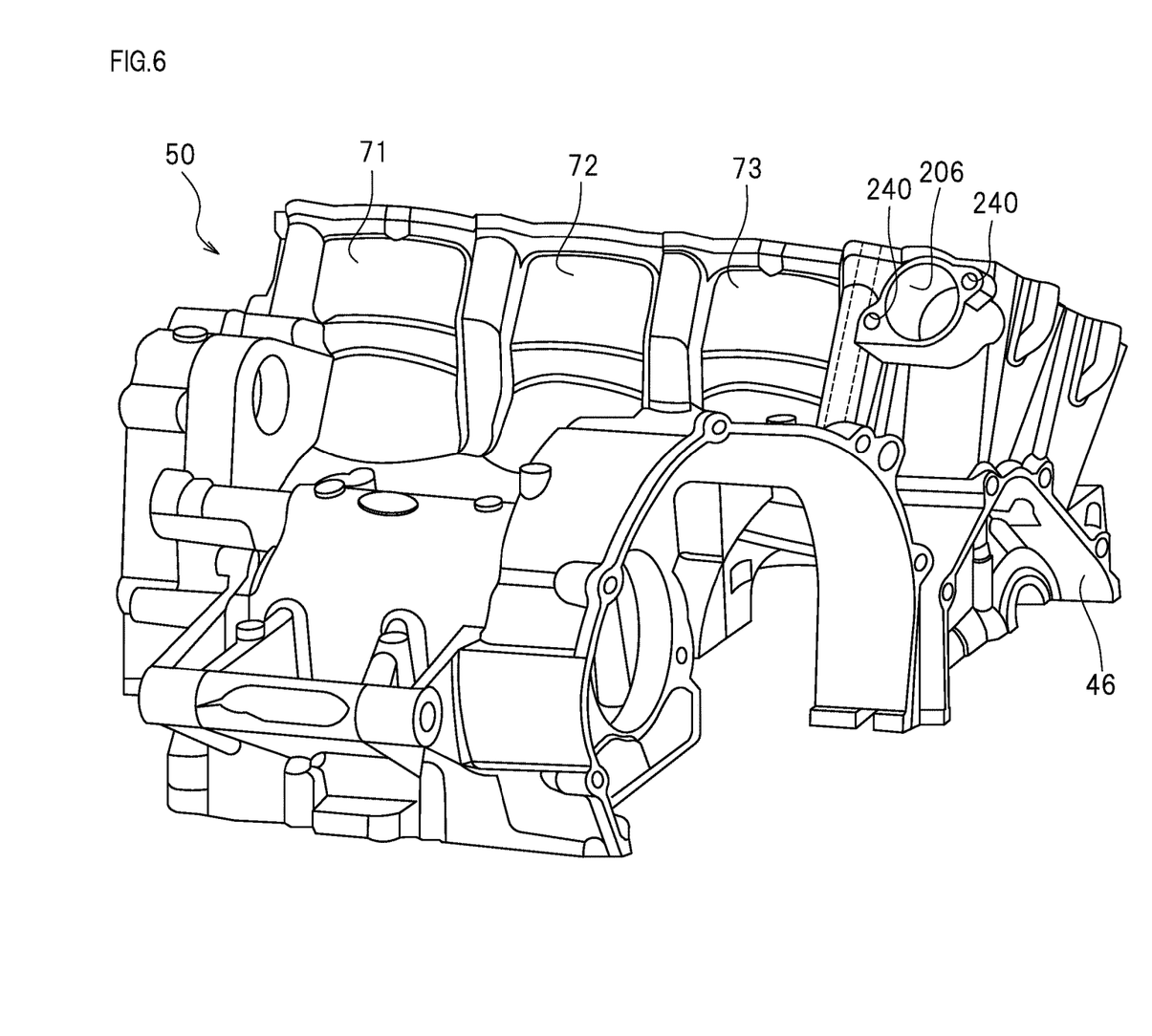
FIG. 6 is a perspective view of the upper crankcase according to a preferred embodiment of the present invention.

The internal combustion engine 40 includes the cam chain 47, first to third chain guides 200, 202, and 204, which are configured to guide the cam chain 47, and a chain tensioner 210 configured to maintain the tension on the cam chain 47 appropriately. The cam chain 47, the chain guides 200, 202, and 204, and the chain tensioner 210 are accommodated in the cam chain chamber 46. The cam chain 47 includes a first portion 47A, a second portion 47B and a third portion 47C. The first portion 47A is positioned between the sprocket 42S and the cam chain sprocket 84S. The second portion 47B is positioned between the cam chain sprocket 84S and the cam chain sprocket 86S. The third portion 47C is positioned between the cam chain sprocket 86S and the sprocket 42S. The first chain guide 200 guides the first portion 47A of the cam chain 47. The second chain guide 202 guides the second portion 47B of the cam chain 47. The third chain guide 204 guides the third portion 47C of the cam chain 47. The chain tensioner 210 is inserted in a chain tensioner insertion hole 206 located in the cylinder body 70. The chain tensioner 210 is fitted to the cylinder body 70 preferably by a bolt, which is not shown in the drawings and which is inserted in a bolt insertion hole 240 (see FIG. 6) located in the cylinder body 70. Although the chain tensioner 210 preferably is fitted to the cylinder body 70 in the present preferred embodiment, it is possible that a chain tensioner insertion hole may be provided in the cylinder head 80 so that the chain tensioner 210 can be fitted to the cylinder head 80.

Figure 5:
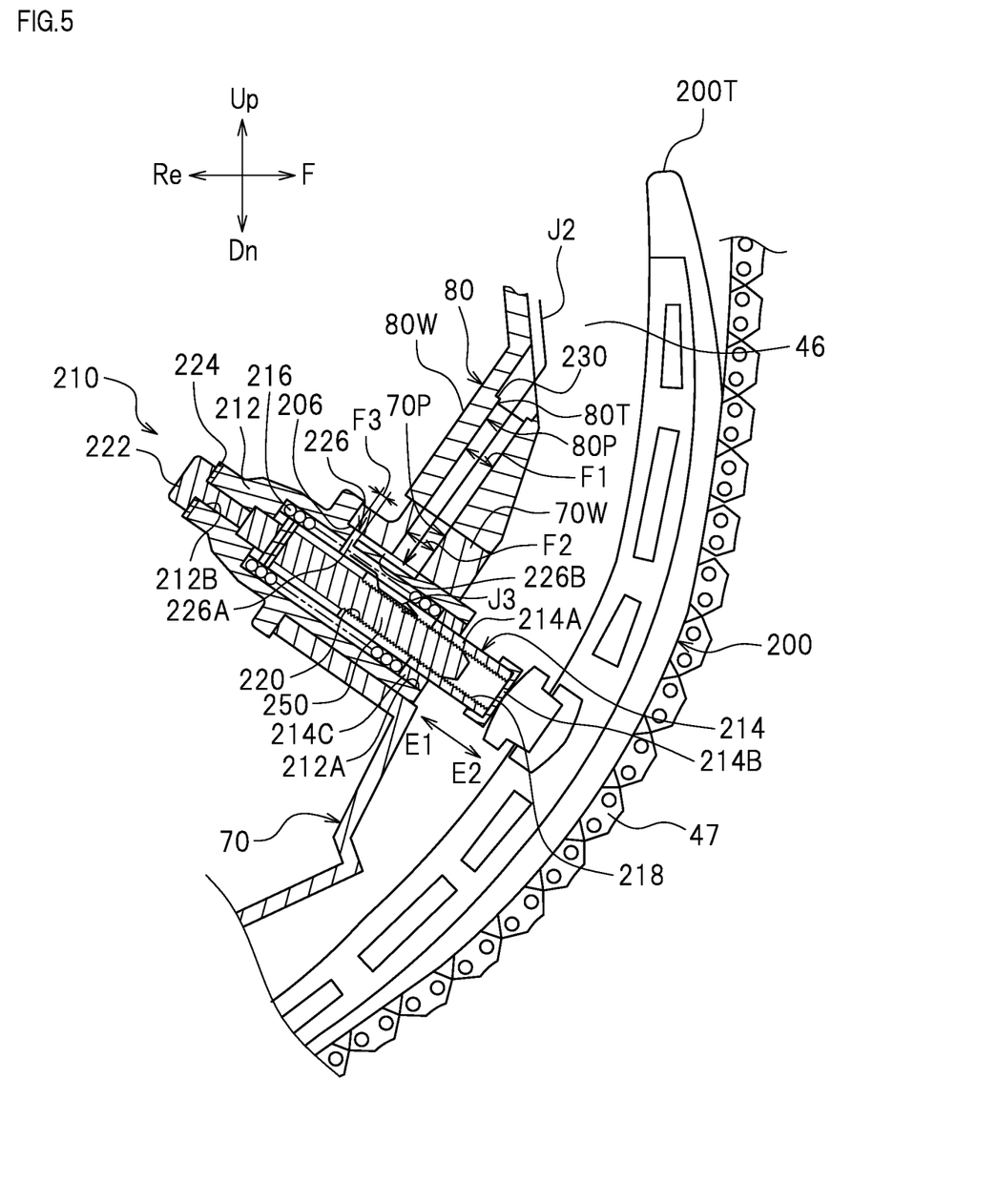
FIG. 5 is a cross-sectional view illustrating a chain tensioner and its surrounding structure according to a preferred embodiment of the present invention.

As illustrated in FIG. 5, the chain tensioner 210 includes a case main body 212 that preferably is cylindrical or substantially cylindrical, a plunger 214 sliding in the case main body 212, and a coil spring 216 biasing the first chain guide 200 against the cam chain 47 via the plunger 214. The case main body 212 accommodates the coil spring 216 and a rod-shaped member 250. The coil spring 216 is disposed so as to wrap around the rod-shaped member 250. The plunger 214 preferably has a closed-bottom cylindrical or substantially cylindrical shape, and a main body portion 214A sliding in the case main body 212, a first contact portion 214B contacting the first chain guide 200, and a second contact portion 214C contacting the coil spring 216. The main body portion 214A of the plunger 214 is inserted into the case main body 212 from one opening 212A of the case main body 212. The rod-shaped member 250 is inserted into the plunger main body portion 214A. A bolt 222 is inserted from the other opening 212B of the case main body 212, and the bolt 222 is secured to the case main body 212 via a washer 224.

A plurality of interlocking teeth 218 are preferably provided on a surface (on the inner surface in the present preferred embodiment) of the main body portion 214A of the plunger 214. A plurality of engaging portions 220 to be engaged with the interlocking teeth 218 are provided on a portion of the rod-shaped member 250 near the opening 212A of the case main body 212. When the interlocking teeth 218 and the engaging portions 220 are engaged with each other, the biasing force of the coil spring 216 permits the plunger 214 to move in a direction toward the first chain guide 200 (i.e., in the direction indicated by arrow E2 in FIG. 5) but inhibits the plunger 214 from moving in a direction away from the first chain guide 200 (i.e., in the direction indicated by arrow E1 in FIG. 5).

The cylinder body 70 includes an oil supply passage 70P. The oil supply passage 70P extends in a vertical direction (the term "vertical direction" herein is meant to include up and down directions inclined from the vertical direction, in addition to a strict vertical direction). The oil supply passage 70P is provided in an inner wall 70W of the cylinder body 70. The cylinder head 80 includes an oil supply passage 80P.

The oil supply passage 80P extends in a vertical direction (the term "vertical direction" herein is meant to include up and down directions inclined from the vertical direction, in addition to a strict vertical direction). The oil supply passage 80P is provided in an inner wall 80W of the cylinder head 80. The oil supply passage 70P and the oil supply passage 80P are in communication with each other. The oil supply passages 70P and 80P are passages configured to supply oil to the chain tensioner 210. The oil supply passage 80P is in communication with the cam chain chamber 46 at a location above the chain tensioner 210. A portion of the oil in the cam chain chamber 46 is supplied to the chain tensioner 210 via the oil supply passages 80P and 70P. A counter bored portion 230 extending radially outward of the oil supply passage 80P is located above the oil supply passage 80P. The cam chain chamber 46 and the oil supply passage 80P are in communication with each other via the counter bored portion 230. An upper end 80T of the oil supply passage 80P is positioned lower than an upper end 200T of the first chain guide 200. It is preferable that at least a portion of the oil supply passages 70P and 80P be positioned closer to the third cylinder 73 (see FIG. 2) than is the cam chain 47. As illustrated in FIG. 3, the oil supply passages 70P and 80P are positioned closer to the third cylinder 73 than is the cam chain 47. The oil supply passages 70P and 80P are positioned more leftward than the cam chain 47. The oil supply passages 70P and 80P are positioned more rearward than the intake camshaft 84A. In the present preferred embodiment, the oil supply passage 70P preferably is provided in the inner wall 70W of the cylinder body 70, and the oil supply passage 80P preferably is provided in the inner wall 80W of the cylinder head 80. However, it is possible that an oil supply passage may be provided in at least one of the inner wall 70W of the cylinder body 70 and the inner wall 80W of the cylinder head 80.

The chain tensioner 210 has an introduction port 226 formed in the case main body 212. The introduction port 226 introduces the oil external to the case main body 212 into the case main body 212. The oil that has passed the introduction port 226 lubricates the plurality of engaging portions 220 located on the rod-shaped member 250 and the plurality of interlocking teeth 218 located on the plunger 214. The introduction port 226 is in communication with the oil supply passage 70P. The inner diameter F1 of the oil supply passage 80P and the inner diameter F2 of the oil supply passage 70P are greater than the inner diameter F3 of the introduction port 226. In the present preferred embodiment, the introduction port 226 preferably includes a first introduction port 226A extending perpendicularly or substantially perpendicularly to the axis of the case main body 212 and a second introduction port 226B extending parallel or substantially parallel to the axis of the case main body 212, but it is possible that the introduction port 226 may include the first introduction port 226A only. When the introduction port 226 includes the first introduction port 226A only, it is preferable that the axial center of the oil supply passage 80P, the axial center of the oil supply passage 70P, and the axial center of the first introduction port 226A be in agreement with one another.

As illustrated in FIG. 4, the cam chain 47 interlocking with the crankshaft 42 moves in the direction indicated by arrow G in FIG. 4. The oil inside the cam chain chamber 46 is brought upward by the cam chain 47. As indicated by arrow J1 in FIG. 4, the oil brought upward by the cam chain 47 goes over the upper end 200T of the first chain guide 200 and collides against a surface 80S of the inner wall 80W of the cylinder head 80. As indicated by arrow J2 in FIG. 4, the oil that has collided against the surface 80S of the inner wall 80W flows downward along the surface 80S, and flows into the counter bored portion 230 (see FIG. 5). The oil that has flown into the counter bored portion 230 is then supplied to the chain tensioner 210 via the oil supply passages 80P and 70P. The chain tensioner 210 includes the introduction port 226, and the introduction port 226 is in communication with the oil supply passage 70P. Accordingly, the oil supplied to the chain tensioner 210 flows between the engaging portions 220 of the rod-shaped member 250 and the interlocking teeth 218 of the plunger 214, as indicated by arrow J3 in FIG. 5.

As illustrated in FIG. 5, in the internal combustion engine 40 according to the present preferred embodiment, the chain tensioner 210 provided in the cam chain chamber 46 includes the plunger 214 sliding in the case main body 212, the coil spring 216 biasing the first chain guide 200 against the cam chain 47 via the plunger 214, and the engaging portion 220 configured to inhibit the plunger 214 from moving in a direction away from the first chain guide 200, as already described above. The oil supply passage 70P is preferably located in the inner wall 70W of the cylinder body 70, while the oil supply passage 80P is preferably located in the inner wall 80W of the cylinder head 80. Since the oil supply passages 70P and 80P are located in the inner wall 70W of the cylinder body 70 and the inner wall 80W of the cylinder head 80, respectively, the structure of the internal combustion engine 40 does not become complicated. Moreover, because the oil supply passages 70P and 80P do not need to be formed by independent members, the number of parts included in the internal combustion engine 40 decreases. Accordingly, a cost reduction and a weight reduction of the internal combustion engine 40 are achieved. Furthermore, by introducing the oil scattered from the cam chain 47 into the oil supply passages 70P and 80P, it is possible to supply the oil directly to the chain tensioner 210. As a result, the chain tensioner 210 is operated smoothly, and the strange noise occurring at the contact surface between the engaging portions 220 of the rod-shaped member 250 and the interlocking teeth 214 of the plunger 218 is prevented.

In the present preferred embodiment, the oil supply passage 80P preferably is in communication with the cam chain chamber 46 at a location above the chain tensioner 210, so as to supply the oil within the cam chain chamber 46 to the chain tensioner 210, as illustrated in FIG. 5. This allows a portion of the oil scattered from the cam chain 47 within a region above the chain tensioner 210 to flow into the oil supply passages 80P and 70P, making it possible to directly supply the oil to the chain tensioner 210.

In the present preferred embodiment, the counter bored portion 230 extending radially outward of the oil supply passage 80P preferably is located above the oil supply passage 80P, and the cam chain chamber 46 and the oil supply passage 80P preferably are in communication with each other via the counter bored portion 230, as illustrated in FIG. 5. As a result, a portion of the oil scattered from the cam chain 47 within a region above the chain tensioner 210 is collected in the counter bored portion 230 and allowed to flow into the oil supply passages 80P and 70P. Therefore, a larger amount of oil is supplied directly to the chain tensioner 210.

In the present preferred embodiment, the oil supply passage 80P preferably is positioned closer to the third cylinder 73 (see FIG. 2) than is the cam chain 47, as illustrated in FIG. 3. This allows the oil scattered from the cam chain 47 in a region above the chain tensioner 210 to flow into the oil supply passage 80P more easily.

In the present preferred embodiment, the upper end 80T of the oil supply passage 80P preferably is positioned lower than the upper end 200T of the first chain guide 200, as illustrated in FIG. 5. This allows the oil scattered from the cam chain 47 in a region above the chain tensioner 210 to flow into the oil supply passage 80P more easily.

In the present preferred embodiment, the chain tensioner 210 includes the introduction port 226 located in the case main body 212 and configured to introduce oil external to the case main body 212 into the case main body 212, and the oil supply passage 70P is in communication with the introduction port 226, as illustrated in FIG. 5. This makes it possible to supply oil directly into the case main body 212 and to supply a larger amount of oil to the contact surfaces between the engaging portions 220 of the rod-shaped member 250 and the interlocking teeth 218 of the plunger 214. Therefore, the chain tensioner 210 is operated smoothly.

In the present preferred embodiment, the inner diameter F1 of the oil supply passage 80P and the inner diameter F2 of the oil supply passage 70P are greater than the inner diameter F3 of the introduction port 226. This makes it possible to supply a larger amount of oil directly to a specific portion of the interior of the case main body 212.

Second Preferred Embodiment

Figure 7:
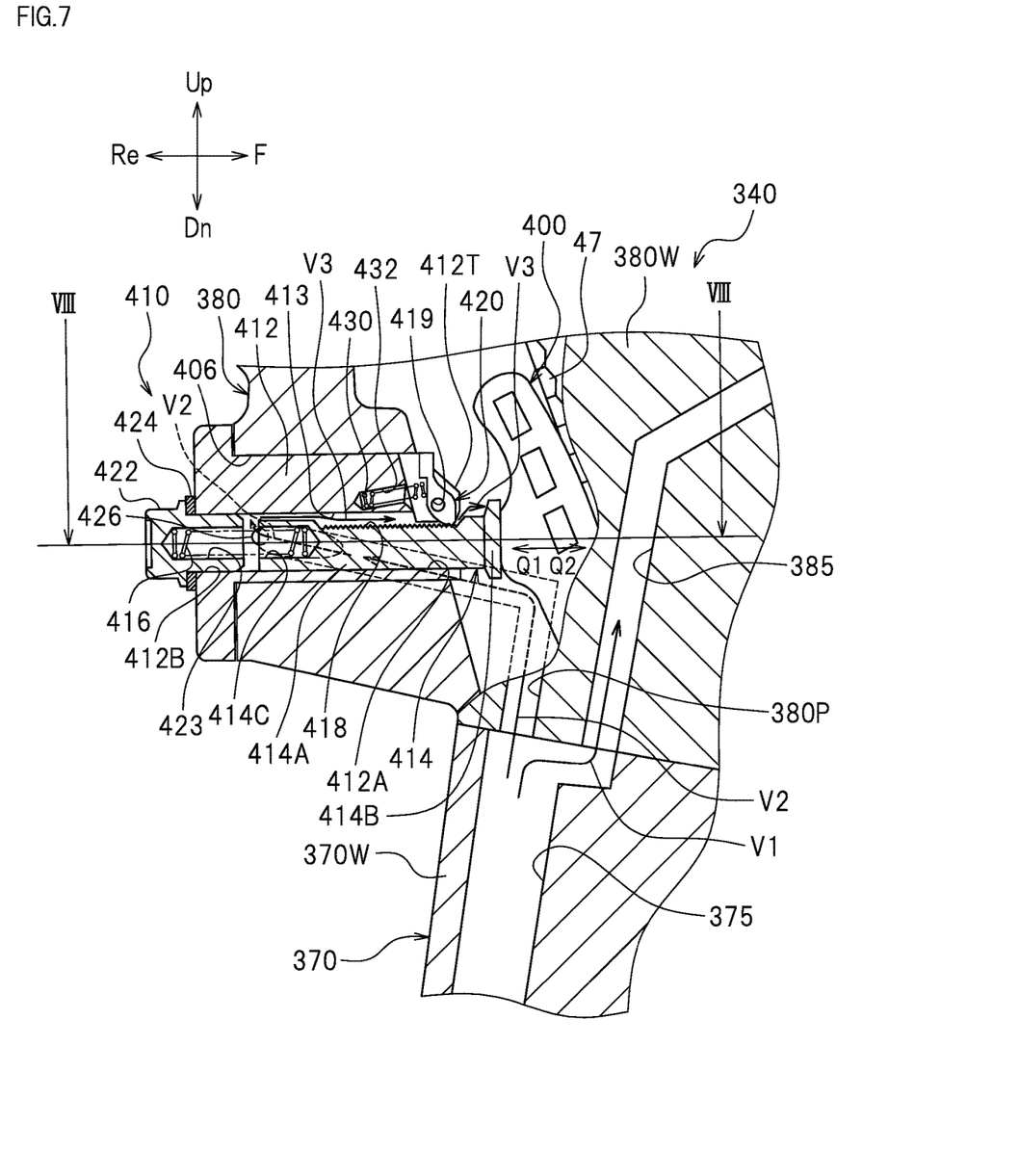
FIG. 7 is a cross-sectional view illustrating a chain tensioner and its surrounding structure according to another preferred embodiment of the present invention.

As illustrated in FIG. 7, in an internal combustion engine 340 according to the present preferred embodiment, a chain tensioner 410 is inserted in a chain tensioner insertion hole 406 located in a cylinder head 380 so that the chain tensioner 410 preferably is fitted to the cylinder head 380. Although the chain tensioner 410 preferably is fitted to the cylinder head 380 in the present preferred embodiment, it is possible that a chain tensioner insertion hole may be provided in the cylinder body 370 so that the chain tensioner 410 is fitted to the cylinder body 370.

The chain tensioner 410 includes a case main body 412 that preferably is cylindrical or substantially cylindrical, a plunger 414 sliding in the case main body 412, and a coil spring 416 biasing a first chain guide 400 against the cam chain 47 via the plunger 414. The plunger 414 includes a main body portion 414A sliding within the case main body 412 and a contact portion 414B contacting the first chain guide 400. The main body portion 414A of the plunger 414 is inserted from one opening 412A of the case main body 412. A bolt 422 is inserted from the other opening 412B of the case main body 412, and the bolt 422 is secured to the case main body 412 via a washer 424. An insertion hole 414C configured to accommodate a portion of the coil spring 416 is provided in the main body portion 414A of the plunger 414. An insertion hole 423 configured to accommodate a portion of the coil spring 416 is provided in the bolt 422. One end of the coil spring 416 is inserted in the insertion hole 423 of the bolt 422, while the other end of the coil spring 416 is inserted in the insertion hole 414C of the main body portion 414A.

A plurality of interlocking teeth 418 are provided on a surface of the main body portion 414A of the plunger 414. A ratchet shaft 419 is provided at a tip end 412T of the case main body 412. A ratchet pawl 420 engaged with the interlocking teeth 418 of the plunger 414 is fitted onto the ratchet shaft 419. The ratchet pawl 420 is disposed above the plunger 414. The chain tensioner 410 includes a coil spring 430 contacting the ratchet pawl 420 and biasing the ratchet pawl 420 toward the first chain guide 400. A portion of the coil spring 430 is disposed in an insertion hole 432 provided in the case main body 412. When the interlocking teeth 418 and the ratchet pawl 420 are engaged with each other, the biasing force of the coil spring 416 permits the plunger 414 to move in a direction toward the first chain guide 400 (i.e., in the direction indicated by arrow Q2 in FIG. 7), but inhibits the plunger 414 from moving in a direction away from the first chain guide 400 (i.e., in the direction indicated by arrow Q1 in FIG. 7).

Figure 8:
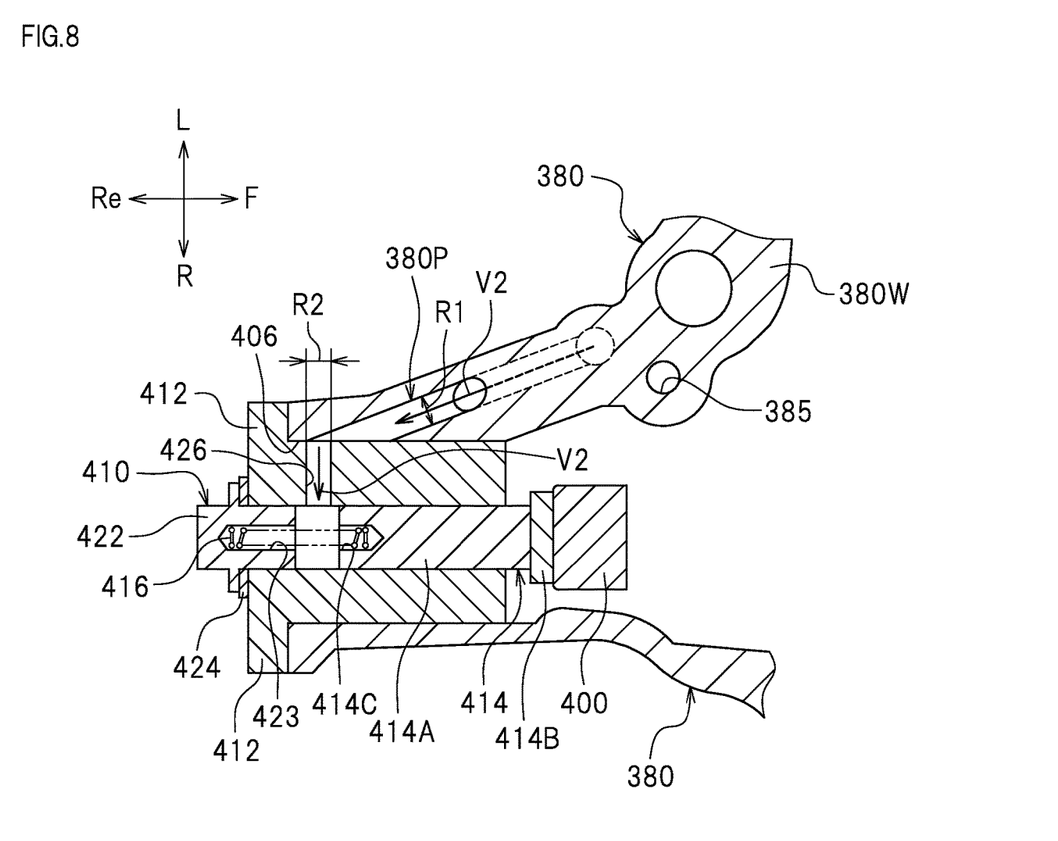
FIG. 8 is a cross-sectional view taken along line VIII-VIII in FIG. 7.

The cylinder body 370 includes a first oil passage 375 configured to circulate the oil to be supplied to the cylinder head 380. The first oil passage 375 preferably is integrally formed within an inner wall 370W of the cylinder body 370 so as to constitute one monolithic member. The cylinder head 380 includes a second oil passage 385 that is in communication with the first oil passage 375. As illustrated in FIG. 8, the second oil passage 385 preferably is integrally formed within an inner wall 380W of the cylinder head 380 so as to constitute one monolithic member.

The cylinder head 380 includes an oil supply passage 380P. The oil supply passage 380P is a passage configured to supply oil to the chain tensioner 410. The oil passage 380P is provided in the inner wall 380W of the cylinder head 380. One end of the oil supply passage 380P opens in a mounting surface of the cylinder head 380. As illustrated in FIG. 8, the other end of the oil supply passage 380P opens in the chain tensioner insertion hole 406. The oil supply passage 380P and the first oil passage 375 are in communication with each other at a location where the cylinder head 380 and the cylinder body 370 are joined to each other. The oil supply passage 380P is positioned to the left of the chain tensioner 410. The oil supply passage 380P is positioned more rearward than the second oil passage 385. Although the oil supply passage 380P is in communication with the first oil passage 375 in the present preferred embodiment, it is also possible that the oil supply passage 380P may be in communication with the second oil passage 385.

As illustrated in FIG. 8, the chain tensioner 410 includes an introduction port 426 provided in the case main body 412. The introduction port 426 introduces the oil external to the case main body 412 into the case main body 412. The oil that has passed the introduction port 426 lubricates the plurality of interlocking teeth 418 (see FIG. 7) provided on the plunger 414. The introduction port 426 is in communication with the oil supply passage 380P. The inner diameter R1 of the oil supply passage 380P is greater than the inner diameter R2 of the introduction port 426.

As illustrated in FIG. 7, the oil reserved in the oil pan 18 (see FIG. 1) is supplied to the first oil passage 375 of the cylinder body 370 by an oil pump, which is not shown in the drawings. A portion of the oil supplied to the first oil passage 375 flows into the second oil passage 385 of the cylinder head 380, as indicated by arrow V1 in FIG. 7, so as to be supplied to the intake camshaft 84A (see FIG. 3) and the exhaust camshaft 86A (see FIG. 3). Another portion of the oil supplied to the first oil passage 375 flows into the oil supply passage 380P of the cylinder head 380, as indicated by arrow V2 in FIG. 7. The oil that has flowed into the oil supply passage 380P is supplied to the chain tensioner 410. The chain tensioner 410 includes the introduction port 426, and the introduction port 426 is in communication with the oil supply passage 380P. Accordingly, the oil supplied to the chain tensioner 410 flows between an inner wall surface 413 of the case main body 412 and the interlocking teeth 418 of the plunger 414, as indicated by arrow V3 in FIG. 7.

In the present preferred embodiment, the oil supply passage 380P is provided in the inner wall 380W of the cylinder head 380, as illustrated in FIG. 7, so the structure of the internal combustion engine 340 does not become complicated. Moreover, because the oil supply passage 380P does not need to be provided by an independent member, the number of parts included in the internal combustion engine 340 decreases. Accordingly, a cost reduction and a weight reduction of the internal combustion engine 340 are achieved. Furthermore, by introducing the oil circulating in the internal combustion engine 340 into the oil supply passage 380P, it is possible to supply the oil directly to the chain tensioner 410. As a result, the chain tensioner 410 is operated smoothly, and the strange noise occurring at the contact surface between the ratchet pawl 420 and the interlocking teeth 418 of the plunger 414 is prevented.

In the present preferred embodiment, the cylinder body 370 preferably includes the first oil passage 375 configured to circulate the oil supplied to the cylinder head 380. The cylinder head 380 preferably includes the second oil passage 385 in communication with the first oil passage 375. The oil supply passage 380P preferably is in communication with the first oil passage 375. This allows a portion of the oil forcibly supplied to the cylinder head 380 to flow into the oil supply passage 380P, making it possible to directly supply the oil to the chain tensioner 410.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An internal combustion engine comprising:
   a cylinder body including a cylinder therein;
   a cylinder head joined to the cylinder body;
   a cam chain chamber provided in the cylinder body and the cylinder head, and configured to accommodate a cam chain and a chain guide configured to guide the cam chain;
   a chain tensioner provided in the cam chain chamber, and including a case main body, a plunger sliding in the case main body, a spring biasing the chain guide against the cam chain via the plunger, interlocking teeth located on a surface of the plunger, and an engaging portion engaged with the interlocking teeth and configured to inhibit the plunger from moving in a direction away from the chain guide; and
   an oil supply passage provided in an inner wall of at least one of the cylinder head and the cylinder body, and configured to supply oil to the chain tensioner; wherein
   the oil supply passage is in communication with the cam chain chamber at a location above the chain tensioner so as to supply the oil from within the cam chain chamber to the chain tensioner.

2. The internal combustion engine according to claim 1, further comprising:
   a counter bored portion located above the oil supply passage and extending radially outward of the oil supply passage; wherein
   the cam chain chamber and the oil supply passage are in communication with each other via the counter bored portion.

3. The internal combustion engine according to claim 1, wherein at least a portion of the oil supply passage is positioned closer to the cylinder than is the cam chain.

4. The internal combustion engine according to claim 1, wherein an upper end of the oil supply passage is positioned lower than an upper end of the chain guide.

5. The internal combustion engine according to claim 1, wherein:
   the cylinder body includes a first oil passage configured to circulate oil supplied to the cylinder head;
   the cylinder head includes a second oil passage in communication with the first oil passage; and
   the oil supply passage is in communication with the first oil passage or the second oil passage.

6. The internal combustion engine according to claim 1, wherein:
   the chain tensioner includes an introduction port provided in the case main body and configured to introduce oil external to the case main body into the case main body; and
   the oil supply passage is in communication with the introduction port.

7. The internal combustion engine according to claim 6, wherein the oil supply passage has an inner diameter greater than that of the introduction port.

8. A motorcycle comprising an internal combustion engine according to claim 1.

* * * * *